(12) United States Patent
Fassetta et al.

(10) Patent No.: US 9,140,382 B2
(45) Date of Patent: Sep. 22, 2015

(54) GRIPPER FOR CONTINUOUS ELONGATED MEMBERS, VEHICLE MOVABLE ALONG A CONTINUOUS ELONGATED MEMBER, AND METHOD OF ADVANCING THE VEHICLE

(75) Inventors: Alberto Fassetta, Venice (IT); Paolo Vielmo, Domegge di Cardore (IT)

(73) Assignee: SAIPEM S.p.A., San Donato Milanese (IT)

( * ) Notice: Subject to any disclaimer, the term of this patent is extended or adjusted under 35 U.S.C. 154(b) by 284 days.

(21) Appl. No.: 13/500,235

(22) PCT Filed: Oct. 5, 2010

(86) PCT No.: PCT/IB2010/002513
§ 371 (c)(1),
(2), (4) Date: Jun. 19, 2012

(87) PCT Pub. No.: WO2011/042790
PCT Pub. Date: Apr. 14, 2011

(65) Prior Publication Data
US 2012/0312220 A1    Dec. 13, 2012

(30) Foreign Application Priority Data
Oct. 5, 2009 (IT) ............................. M109A001702

(51) Int. Cl.
*F16L 1/16* (2006.01)
*E02F 5/10* (2006.01)

(52) U.S. Cl.
CPC . *F16L 1/16* (2013.01); *E02F 5/101* (2013.01); *E02F 5/104* (2013.01)

(58) Field of Classification Search
CPC ............... F16L 1/20; F16L 1/207; F16L 3/02; F16L 3/04; F16L 3/08; F16L 3/10; F16L 3/1041; F16L 7/00; F16L 7/02
USPC ................. 405/158, 159, 161, 163, 164, 165, 405/184.4
See application file for complete search history.

(56) References Cited

U.S. PATENT DOCUMENTS 2,816,575 A * 12/1957 Stokes ........................ 405/154.1
3,023,995 A    3/1962 Hopkins
3,038,732 A * 6/1962 Scott et al. ..................... 277/605
3,589,580 A    6/1971 Smulders (Continued)

FOREIGN PATENT DOCUMENTS

GB     2364758    6/2002
GB     2448829    10/2008
NL     7414393    5/1975

OTHER PUBLICATIONS

International Search Report and Written Opinion for International Appl. No. PCT/IB2010/002513, European Patent Office, The Netherlands, mailed on Jan. 7, 2011, 9 pages.

(Continued)

*Primary Examiner* — Frederick L Lagman
(74) *Attorney, Agent, or Firm* — Sterne, Kessler, Goldstein & Fox P.L.L.C.

(57) ABSTRACT

A gripper for selectively gripping continuous elongated members can include a tubular supporting structure extending along a given axis and designed to surround a continuous elongated member. The gripper can also include at least two inflatable bags within the tubular structure and in the shape of complementary cylindrical sectors.

9 Claims, 2 Drawing Sheets

(56) References Cited

U.S. PATENT DOCUMENTS

| | | | |
|---|---|---|---|
| 3,734,138 A * | 5/1973 | Brown et al. | 405/217 |
| 4,149,326 A * | 4/1979 | Rosa et al. | 405/162 |
| 4,274,760 A * | 6/1981 | Norman | 405/163 |
| 4,338,042 A * | 7/1982 | Faldi | 405/164 |
| 4,338,045 A * | 7/1982 | Cour | 405/172 |
| 4,516,880 A * | 5/1985 | Martin | 405/160 |
| 4,586,850 A * | 5/1986 | Norman et al. | 405/163 |
| 4,989,909 A | 2/1991 | Bouligny, Jr. et al. | |
| 5,238,331 A * | 8/1993 | Chapman | 405/303 |
| 5,575,590 A * | 11/1996 | Drost et al. | 405/166 |
| 6,273,642 B1 * | 8/2001 | Anderson | 405/163 |
| 6,705,029 B2 * | 3/2004 | Anderson | 405/163 |

OTHER PUBLICATIONS

International Preliminary Report on Patentability for International Appl. No. PCT/IB2010/002513, European Patent Office, The Netherlands, mailed on Nov. 1, 2011, 16 pages.

European Office Action for Appl. No. 10 782 370.0, European Patent Office, The Netherlands, May 10, 2013, 4 pages.

* cited by examiner

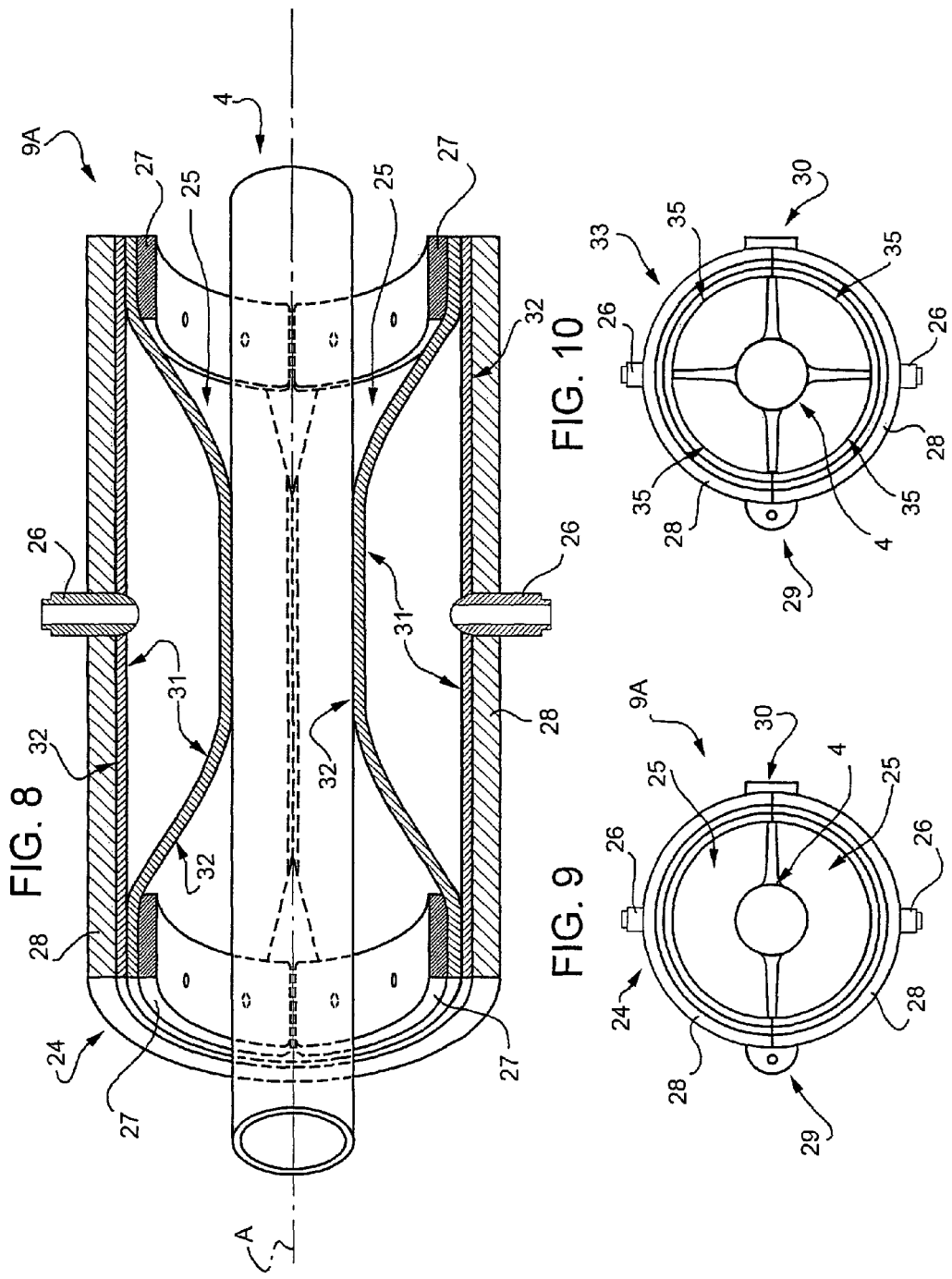

GRIPPER FOR CONTINUOUS ELONGATED MEMBERS, VEHICLE MOVABLE ALONG A CONTINUOUS ELONGATED MEMBER, AND METHOD OF ADVANCING THE VEHICLE

TECHNICAL FIELD

The present invention relates to a gripper for selectively gripping continuous elongated members; a vehicle which employs such a gripper to move forward; and a method of advancing the vehicle.

BACKGROUND ART

The term "continuous elongated member" used in the present invention applies to pipelines and cables of finite length, but much longer than the gripper.

Continuous elongated members are laid both on land and on underwater beds, normally to transport fossil fuel and electric power over distances of kilometers; are normally buried and circular in cross section; and are handled using grippers comprising jaws with grip surfaces complementary to the shape and size of the continuous elongated member, as shown, for example, in GB 2,364,758. Using this type of gripper, the jaws must be adapted to continuous elongated members of different diameters, to achieve a sufficient grip surface area along the jaws.

Another type of gripper, described in GB 2,448,829, is used to temporarily connect equipment to the end of an underwater pipeline, or to two facing ends of two separate underwater-pipeline portions, and comprises a tubular structure; and inflatable rings housed inside the tubular structure, and which are selectively brought into contact with the outer surface of the pipeline or pipeline portions. This type of gripper also fails to effectively grip continuous elongated members of widely differing diameters, on account of each ring being designed for a circular-section pipeline slightly smaller in diameter than the inside diameter of the tubular structure. Moreover, the rings fail to define a sufficiently large grip surface area.

Continuous elongated members may even have non-circular, irregularly shaped cross sections, and, in fact, are known to be defined by a number of adjacent, connected pipes, or by bundles of cables. Which means the cross sections may assume any number of shapes, for which known grippers fail to provide a sufficiently large grip surface area.

DISCLOSURE OF INVENTION

It is an object of the present invention to provide a gripper designed to eliminate the above drawbacks of the known art, and which, in particular, defines a sufficiently large grip surface area even along continuous elongated members with highly irregularly shaped cross sections.

According to the present invention, there is provided a gripper for selectively gripping continuous elongated members, the gripper comprising a tubular supporting structure extending along a given axis and designed to surround a continuous elongated member; the gripper being characterized by comprising at least two inflatable bags, which are fixed inside the tubular structure and to the tubular structure, have the shape of complementary cylindrical sectors, are elongate, and extend predominantly parallel to the axis; and two attachments for hoses for selectively inflating the inflatable bags, wherein each inflatable bag is made from a flexible, elastic sheet.

Another object of the present invention is to provide a method of advancing a vehicle along a continuous elongated member.

According to the present invention, there is provided a method of advancing a vehicle in a first direction along a continuous elongated member, in particular a continuous elongated member extending along a given path on the bed of a body of water; the method comprising the steps of:

a) clamping the continuous elongated member by means of a gripper fitted to the frame of the vehicle, and which comprises a tubular supporting structure extending along a given axis and designed to surround the continuous elongated member;

b) moving the gripper with respect to the frame, in a second direction opposite the first direction parallel to the path, and while the gripper is clamped to the continuous elongated member, so as to advance the frame, with respect to the continuous elongated member, along the given path;

c) releasing the gripper from the continuous elongated member;

d) moving the gripper with respect to the frame and the continuous elongated member, in the first direction, while the gripper is released from the continuous elongated member; and e) repeating steps a) to d) so as to move the vehicle in steps along the continuous elongated member; the method being characterized in that the gripper comprises and at least two inflatable bags, which are fixed inside the tubular structure and to the tubular structure, have the shape of complementary cylindrical sectors, are elongated, and extend predominantly parallel to the axis; and two attachments for hoses for selectively inflating the inflatable bags; wherein each inflatable bag is made from a flexible, elastic sheet.

BRIEF DESCRIPTION OF THE DRAWINGS

A number of non-limiting embodiments of the present invention will be described by way of example with reference to the accompanying drawings, in which:

FIG. 8 shows a view in perspective, with parts removed for clarity and parts in longitudinal section, of a gripper in accordance with the present invention;

FIG. 9 shows a partly sectioned, smaller-scale, schematic front view of the FIG. 8 gripper;

FIG. 10 shows a schematic front view, with parts removed for clarity, of a variation of the FIG. 9 gripper.

BEST MODE FOR CARRYING OUT THE INVENTION

Figure 1:
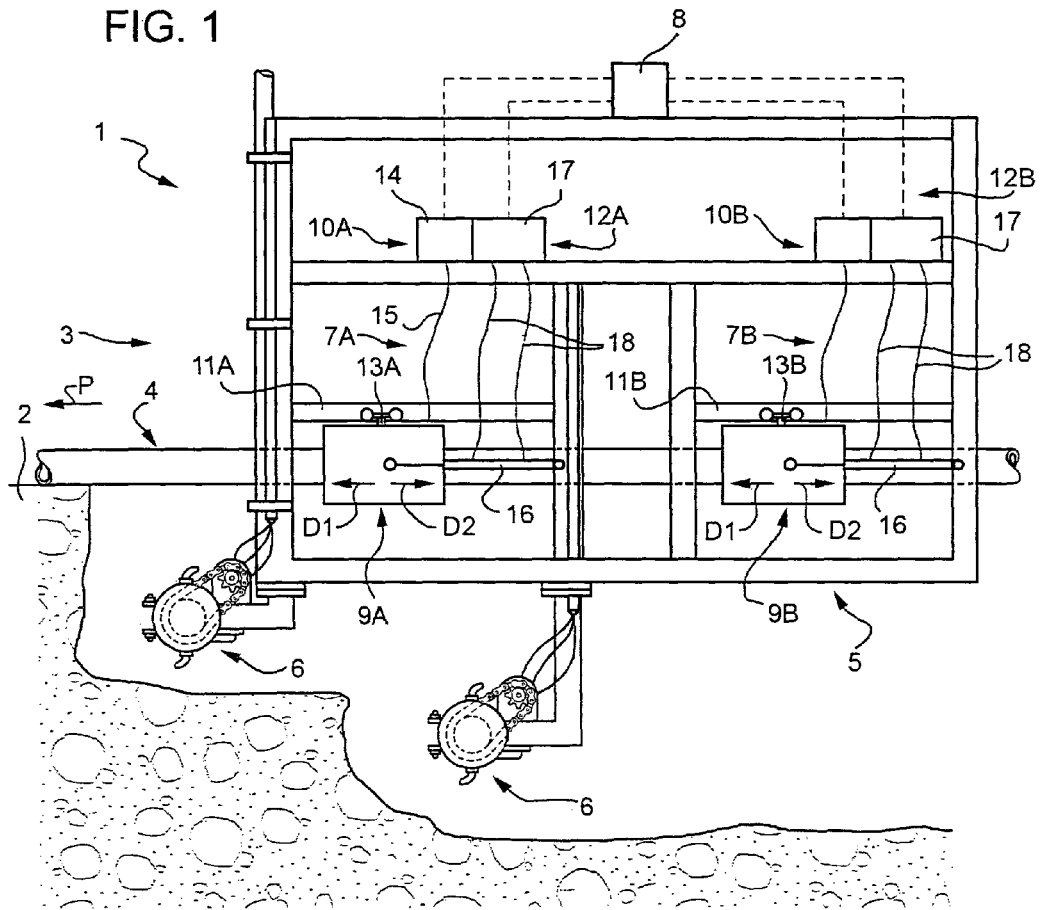
FIG. 1 shows a partly sectioned side view, with parts removed for clarity, of a vehicle, in accordance with the present invention, for burying an underwater pipeline in the bed of a body of water.

Number 1 in FIG. 1 indicates as a whole a vehicle for burying continuous elongated members in the bed 2 of a body of water 3.

For the purpose of the present description, the term "body of water" is intended to mean any stretch of water, such as sea, ocean, lake, etc., and the term "bed" is intended to mean the concave layer of the earth's crust containing the body of water.

Vehicle 1 is designed to bury a continuous elongated member 4—in the example shown, an underwater pipeline—extending along a given path P on bed 2, and laid beforehand on bed 2 by a known laying vessel (not shown). Vehicle 1 is controlled by a support vessel (not shown), and comprises a frame 5; two tools 6—in the example shown, cutters—fitted to frame 5; two gripping units 7A, 7B fitted to frame 5; and a control unit 8. Continuous elongated member 4 actually guides and anchors vehicle 1, which, as it advances, cuts into a layer of bed 2 directly beneath continuous elongated member 4, to sink continuous elongated member 4 into bed 2 of body of water 3.

Gripping units 7A, 7B comprise respective grippers 9A, 9B; and respective drives 10A, 10B for selectively connecting grippers 9A, 9B integral with continuous elongated member 4. In the example shown, gripping units 7A, 7B serve to advance vehicle 1, which accordingly comprises two guides 11A, 11B and two further drives 12A, 12B; and grippers 9A, 9B are mounted to run along respective guides 11A, 11B, and, in the example shown, comprise respective carriages 13A, 13B. Guides 11A, 11B are fitted to frame 5, are aligned with one another, and, in use, are substantially parallel to path P.

Each drive 10A, 10B comprises at least one valve 14, and at least one hose 15 (only one shown) extending between valve 14 and gripper 9A, 9B to control a gas—in the example shown, compressed air. Valve 14 is in turn supplied by a compressor (not shown) on the support vessel (not shown).

Each drive 12A, 12B comprises two double-acting hydraulic cylinders 16 (only one shown in FIG. 1) on opposite sides of respective gripper 9A, 9B; a valve 17 for controlling hydraulic cylinders 16; and hoses 18 extending between valve 17 and hydraulic cylinders 16. Each hydraulic cylinder 16 is connected to frame 5 and to respective gripper 9A, 9B to move with respect to frame 5. Each drive 12A, 12B is connected to a hydraulic pump (not shown) mounted on frame 5 or the supporting vessel (not shown). And drives 12A, 12B serve to move respective grippers 9A, 9B selectively between two given stops, in a direction D1 or a direction D2 opposite direction D1.

Control unit 8 is supplied with control signals, by which to control operation of valves 14 and 17 and move vehicle 1 forward.

More specifically, control unit 8 controls drives 10A, 10B, 12A, 12B to: clamp gripper 9A onto continuous elongated member 4; release gripper 9B from continuous elongated member 4; move gripper 9A in direction D2, with gripper 9A clamped to continuous elongated member 4, and gripper 9B released from continuous elongated member 4; and, at the same time, move gripper 9B in direction D1. Vehicle 1 thus moves one step forward in direction D1, by an amount substantially equal to the movement of gripper 9A with respect to frame 5, while gripper 9B is positioned ready to make the next step forward of vehicle 1, by repeating the above operations with grippers 9A and 9B inverted.

In a variation not shown, the vehicle is equipped with only one gripper, which means each forward step is followed by a pause to restore the gripper to the start position for the next step.

In another variation not shown, the vehicle comprises a number of grippers to achieve a greater contact surface area.

Figure 2:
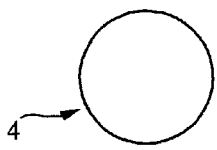
FIGS. 2 to 7 show schematics, with parts removed for clarity, of cross sections of continuous elongated members.

In FIG. 1, continuous elongated member 4 has a circular cross section, as shown in FIG. 2, though vehicle 1 is designed to bury continuous elongated members of any cross sectional shape.

Figure 3:
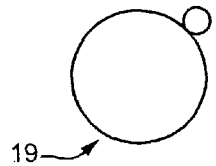

For example, FIG. 3 shows the cross section of a continuous elongated member 19 comprising two joined pipes with circular cross sections of different diameters.

Figure 4:
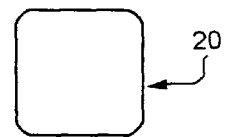

FIG. 4 shows a continuous elongated member 20 with a substantially square cross section.

Figure 5:
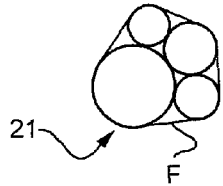

FIG. 5 shows a continuous elongated member 21 comprising a bundle of cables tied with straps F.

Figure 6:
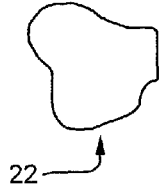

FIG. 6 shows a continuous elongated member 22 defined by a cable with an irregular cross section.

Figure 7:
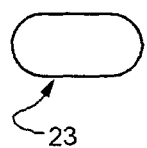

FIG. 7 shows a continuous elongated member 23 defined by a cable with a depressed cross section.

With reference to FIG. 8, gripper 9A (and likewise gripper 9B) comprises a tubular structure 24 extending along an axis A; two inflatable bags 25 inside tubular structure 24; two attachments 26 for hoses 15 (FIG. 1); and fasteners 27 for securing inflatable bags 25 to tubular structure 24.

In the example shown, tubular structure 24 is preferably made of metal, has a circular cross section, and is longer than its diameter. With reference to FIG. 9, tubular structure 24 comprises two semicylindrical shells 28, which are hinged to each other by a hinge 29, are fastened shut by fasteners 30, and are releasable to fit gripper 9A about any point along continuous elongated member 4.

Each bag 25 extends substantially the whole length of tubular structure 24 (FIG. 8) and about a cylindrical sector substantially equal in size to a respective shell 28 (FIG. 9). In fact, as shown in FIG. 9, inflatable bags 25 are complementary.

With reference to FIG. 8, each bag 25 is made from a tubular sheet of flexible, elastic polymer material, having an inner face 31 glued at the ends to seal the tubular sheet into a bag; and an outer face 32, which partly contacts the inner face of the tubular structure, and is designed to partly contact continuous elongated member 4.

Use of gripper 9A is obvious from the above description of vehicle 1 (FIG. 1), it being understood, however, that the gripper also applies to other uses in other technical fields. Inflatable bags 25 are pressed selectively against continuous elongated member 4 to clamp gripper 9A to continuous elongated member 4, to enable handling of continuous elongated member 4 by gripper 9A, and to maximize the contact surface area of each inflatable bag 25 without damaging continuous elongated member 4.

Number 33 in FIG. 10 indicates a gripper, which differs from gripper 9A (FIGS. 8 and 9) by comprising four, as opposed to two, inflatable bags 35, and by each inflatable bag 35 extending circumferentially about a substantially 90°, as opposed to 180°, angle.

In this case, the contact surfaces of the larger number of inflatable bags 35 adapt more readily to irregularly shaped continuous elongated members, so less strain is placed on the deformability of the flexible, elastic sheets.

Grippers 9A (9B) and 33 according to the present invention may obviously be used in applications other than the one described in connection with vehicle 1 in FIG. 1, but still involving the manipulation of continuous elongated members.

Clearly, changes may be made to the present invention as described herein without, however, departing from the scope of the accompanying Claims.

The invention claimed is:
1. A vehicle movable along a continuous elongated member to bury the continuous elongated member in the bed of a body of water, the continuous elongated member extending along a given path on the bed, the vehicle comprising:
   a frame;
   at least one gripper for selectively gripping the continuous elongated member, the gripper comprising:
      a tubular supporting structure extending along a given axis and designed to surround the continuous elongated member, at least two inflatable bags fixed inside and to the tubular structure, wherein the at least two inflatable bags have a shape of complementary cylindrical sectors, are elongated, and extend predominantly parallel to the axis, and two attachments for hoses for selectively inflating the inflatable bags, wherein each inflatable bag is made from a flexible, elastic sheet;

at least one drive for selectively clamping the gripper onto the continuous elongated member;

a further drive for moving the gripper back and forth with respect to the frame in two opposite directions substantially parallel to the given axis; and a control unit for controlling the at least one drive and the further drive, so as to coordinate clamping, release, and movement of the gripper, to move the vehicle forward in steps.

2. The vehicle of claim 1, wherein the at least two inflatable bags are deflatable and configured to selectively clamp and release the elongated member; and wherein the two attachments for hoses for selectively inflating the bags are also configured for selectively deflating the bags.

3. The vehicle of claim 2, wherein the inflatable and deflatable bags extend substantially the whole length of the tubular structure, so as to cover an inner face of the tubular structure.

4. The vehicle of claim 2, wherein each inflatable and deflatable bag is fixed to the ends of the tubular structure.

5. The vehicle of claim 2, wherein each inflatable and deflatable bag is made from a tubular sheet.

6. The vehicle of claim 5, wherein each sheet is made of PVC.

7. The vehicle of claim 2, wherein the tubular structure comprises shells selectively detachable to fit the gripper about the continuous elongated member, at least one inflatable and deflatable bag being supported by a respective shell.

8. The vehicle of claim 2, comprising more than two inflatable and deflatable bags.

9. A method of advancing a vehicle in a first direction along a continuous elongated member, in particular a continuous elongated member extending along a given path on the bed of a body of water, the method comprising the steps of:

a) clamping the continuous elongated member by means of a gripper fitted to the frame of the vehicle, and which comprises a tubular supporting structure extending along a given axis and designed to surround the continuous elongated member;

b) moving the gripper, with respect to the frame, in a second direction opposite the first direction parallel to the path, and while the gripper is clamped to the continuous elongated member, so as to advance the frame, with respect to the continuous elongated member, along the given path;

c) releasing the gripper from the continuous elongated member;

d) moving the gripper, with respect to the frame and the continuous elongated member, in the first direction, while the gripper is released from the continuous elongated member; and e) repeating steps a) to d) so as to move the vehicle in steps along the continuous elongated member;

wherein the gripper comprises:

at least two inflatable bags, which are fixed inside the tubular structure and to the tubular structure, have the shape of complementary cylindrical sectors, are elongated, and extend predominantly parallel to the axis; and two attachments for hoses for selectively inflating the inflatable bags;

wherein each inflatable bag is made from a flexible, elastic sheet.

* * * * *